(12) United States Patent
Boren et al.

(10) Patent No.: US 7,954,762 B2
(45) Date of Patent: Jun. 7, 2011

(54) LIGHTWEIGHT AIRCRAFT PASSENGER SEAT WITH COMPOSITE CONSTRUCTION

(75) Inventors: Kelly L. Boren, NW Arlington, WA (US); Max U. Kismarton, Renton, WA (US); Kevin M. Retz, Bothell, WA (US)

(73) Assignee: The Boeing Company, Chicago, IL (US)

( * ) Notice: Subject to any disclaimer, the term of this patent is extended or adjusted under 35 U.S.C. 154(b) by 632 days.

(21) Appl. No.: 11/383,867

(22) Filed: May 17, 2006

(65) Prior Publication Data

US 2007/0267543 A1 Nov. 22, 2007

(51) Int. Cl.
B64D 11/06 (2006.01)
(52) U.S. Cl. .............. 244/122 R; 244/118.6; 297/216.1; 297/452.18
(58) Field of Classification Search .............. 244/122 R, 244/118.6, 122 B; 297/216.1, 445.1, 452.18
See application file for complete search history.

(56) References Cited

U.S. PATENT DOCUMENTS

| | | | | |
|---|---|---|---|---|
| 2,933,127 A * | 4/1960 | Brewster | ................ | 297/216.2 |
| 3,468,582 A * | 9/1969 | Judd | ................ | 297/445.1 |
| 3,893,729 A * | 7/1975 | Sherman et al. | ................ | 297/118 |
| 4,229,040 A * | 10/1980 | Howell et al. | ................ | 297/440.1 |
| 4,296,967 A | 10/1981 | Vogel | | |
| 4,498,649 A * | 2/1985 | Toll | ................ | 244/118.6 |
| 4,630,864 A * | 12/1986 | Toll | ................ | 297/232 |
| 4,632,452 A * | 12/1986 | Vogel | ................ | 297/232 |
| 4,898,426 A * | 2/1990 | Schulz et al. | ................ | 297/452.65 |
| 5,178,345 A * | 1/1993 | Peltola et al. | ................ | 244/118.6 |
| 5,284,379 A * | 2/1994 | Arnold et al. | ................ | 297/113 |
| 5,409,186 A * | 4/1995 | Chow | ................ | 244/122 R |
| 5,597,139 A * | 1/1997 | Beroth | ................ | 244/118.6 |
| 5,660,438 A * | 8/1997 | Tedesco | ................ | 297/284.6 |
| 5,775,642 A * | 7/1998 | Beroth | ................ | 244/118.6 |
| 5,806,928 A * | 9/1998 | Gattuso et al. | ................ | 297/284.6 |
| 5,829,836 A * | 11/1998 | Schumacher et al. | ................ | 297/257 |
| 5,984,415 A * | 11/1999 | Schumacher et al. | ................ | 297/411.2 |
| 6,076,768 A * | 6/2000 | Durand et al. | ................ | 244/118.6 |
| 6,129,419 A * | 10/2000 | Neale | ................ | 297/284.4 |
| 6,176,547 B1 * | 1/2001 | François et al. | ................ | 297/257 |
| 6,213,548 B1 * | 4/2001 | Van Wynsberghe et al. | ................ | 297/216.12 |
| 6,672,661 B2 * | 1/2004 | Williamson | ................ | 297/232 |
| 6,749,266 B2 * | 6/2004 | Williamson | ................ | 297/452.2 |
| 7,182,292 B2 * | 2/2007 | Howard et al. | ................ | 244/122 R |
| 7,354,019 B2 * | 4/2008 | Bauer | ................ | 244/118.6 |
| 7,427,109 B2 * | 9/2008 | Embach et al. | ................ | 297/452.41 |
| 2003/0094542 A1* | 5/2003 | Williamson | ................ | 244/122 R |
| 2007/0096535 A1* | 5/2007 | Lundell et al. | ................ | 297/470 |

FOREIGN PATENT DOCUMENTS

WO WO 85/02384 A 6/1985
WO PCT/US2007/011396 10/2007

* cited by examiner

Primary Examiner — Benjamin P Lee
(74) Attorney, Agent, or Firm — Tung & Associates (57) ABSTRACT

An aircraft seat assembly configured in accordance with an example embodiment of the invention utilizes composite materials to achieve significant weight savings relative to conventional seat designs. The seat assembly includes a lightweight composite support structure, a lightweight composite seat base, and a seat back assembly that employs a lightweight inner frame. The seat cushion and the seat back cushion may utilize a sealed pneumatic element that self-inflates to provide increased air cushioning during flight. The seat assembly can leverage inexpensive manufacturing techniques such that the seat assembly can be economically produced for use as an economy class seat.

18 Claims, 11 Drawing Sheets

LIGHTWEIGHT AIRCRAFT PASSENGER SEAT WITH COMPOSITE CONSTRUCTION

TECHNICAL FIELD

Embodiments of the present invention relate generally to aircraft components. More particularly, embodiments of the present invention relate to lightweight passenger seat configurations for aircraft.

BACKGROUND

Commercial aircraft utilize different passenger seating configurations and designs. Historically, aircraft passenger seats have been manufactured using heavy and bulky materials that satisfy certain structural design requirements and passenger comfort requirements. In this regard, conventional aircraft passenger seats include a number of relatively heavy metal components. Such components can contribute a significant amount to the overall weight of an aircraft, particularly when the aircraft includes seats for hundreds of passengers. Weight reduction is becoming increasingly important in modern aircraft design. A reduction in the weight of the aircraft structure may allow the aircraft to carry more fuel, thus extending the flight range. A reduction in the weight of the aircraft structure may also allow the aircraft to carry additional passengers and/or cargo, thus increasing the potential profitability of the aircraft.

The amount of legroom and personal space in a commercial aircraft influences the overall comfort of the passenger. The size of the passenger seats and the number of seat rows determines the amount of legroom and personal space for a given aircraft. In practice, the bulky materials and thick padding utilized in conventional aircraft passenger seats consume precious cabin space that could otherwise be used for increased legroom and/or used for additional rows of seats. Unfortunately, such bulky materials are usually necessary for structural support and thick padding is usually necessary to provide sufficient cushioning for the seated passengers.

Accordingly, it is desirable to have a lightweight passenger seat for aircraft applications. In addition, it is desirable to have a passenger seat for aircraft applications having a smaller fore-aft dimension relative to conventional passenger seat designs. Furthermore, other desirable features and characteristics of embodiments of the present invention will become apparent from the subsequent detailed description and the appended claims, taken in conjunction with the accompanying drawings and the foregoing technical field and background.

BRIEF SUMMARY

An aircraft passenger seat configured in accordance with an example embodiment of the invention includes a lightweight composite construction that provides weight savings and size reduction compared to conventional seats. The composite construction enables the passenger seat to meet required structural specifications in a compact and lightweight configuration.

The above and other aspects of the invention may be carried out in one embodiment by an aircraft seat assembly that includes: a lightweight composite support structure having an upper end; a lightweight composite seat base having an upper side, a lower side, and a rear section, the lower side being coupled to the upper end of the lightweight composite support structure; a seat cushion positioned on the upper side of the lightweight composite seat base; a seat back frame coupled to the rear section of the lightweight composite seat base; and a seat back cushion coupled to the seat back frame.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically.

Figure 1:
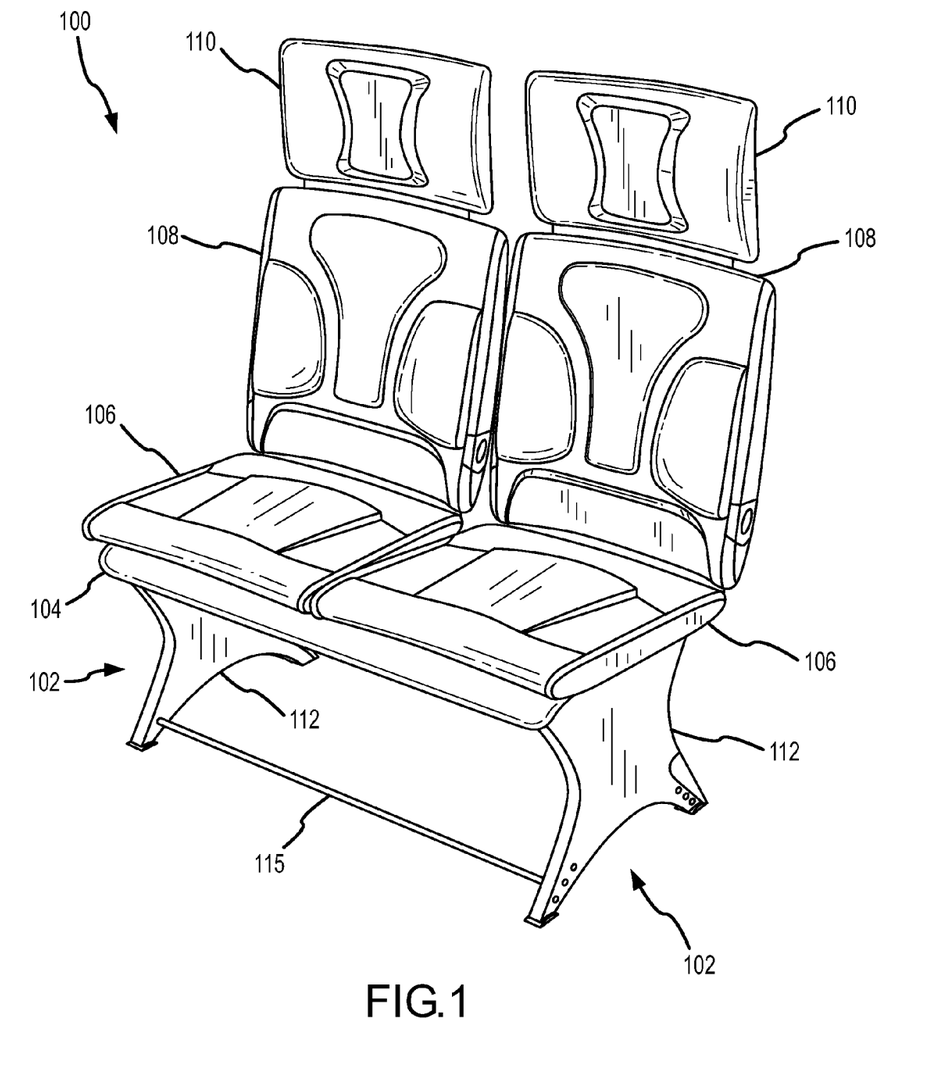
FIG. 1 is a front perspective view of a double seat assembly configured in accordance with an example embodiment of the invention.
Figure 2:
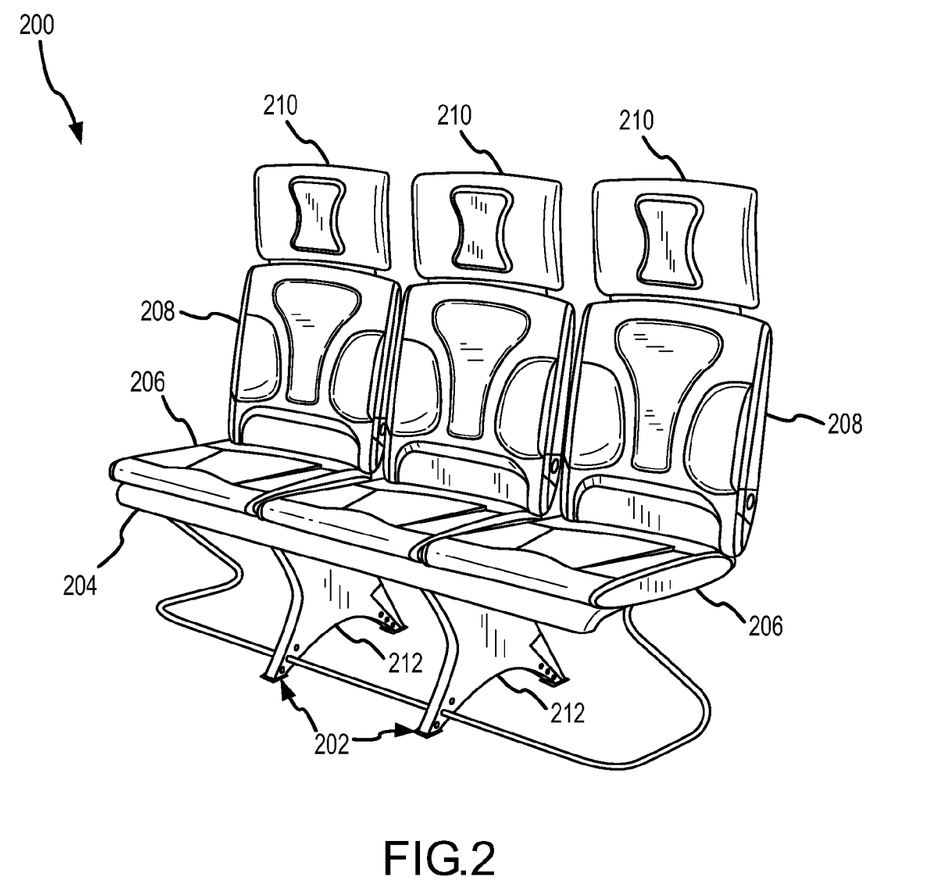
FIG. 2 is a front perspective view of a triple seat assembly configured in accordance with an example embodiment of the invention.
Figure 3:
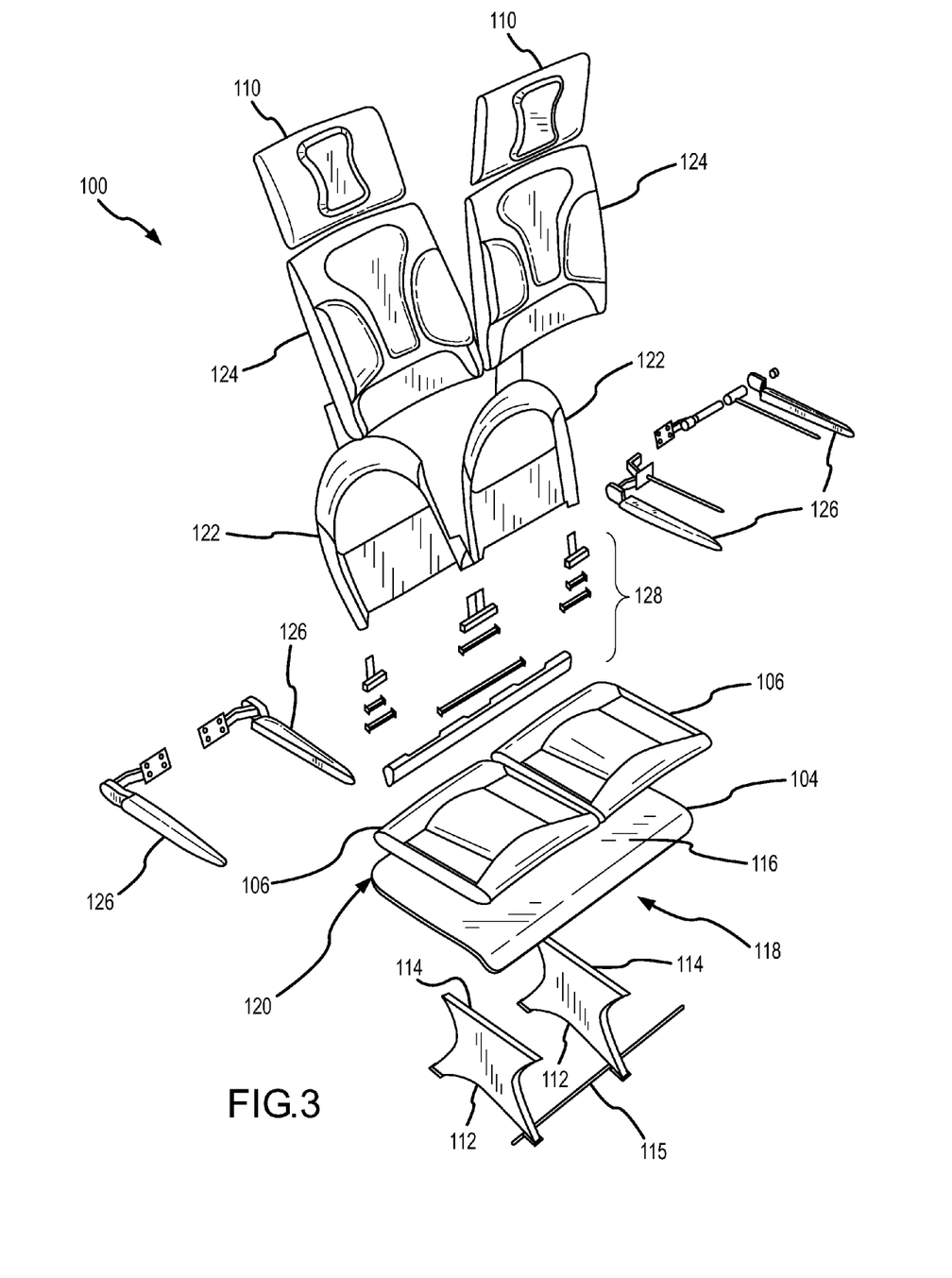
FIG. 3 is an exploded perspective view of the double seat assembly shown in FIG. 1.

FIG. 1 is a front perspective view of a double seat assembly 100 configured in accordance with an example embodiment of the invention, FIG. 2 is a front perspective view of a triple seat assembly 200 configured in accordance with an example embodiment of the invention, and FIG. 3 is an exploded perspective view of double seat assembly 100. These seat assemblies are suitable for use as passenger seats in an aircraft, e.g., a row of seats in a commercial aircraft. Example embodiments of the invention may also be deployed as a single seat assembly (not shown), a quad seat assembly (not shown), or a seat assembly configured to accommodate any number of passengers, limited only by practical size restrictions, structural material properties, and aircraft configuration. The double and triple seat configurations depicted in the figures are not intended to limit or otherwise restrict the application or scope of the invention in any way.

Double seat assembly 100 generally includes a lightweight composite support structure 102, a lightweight composite seat base 104 sized to accommodate two passengers, two seat cushions 106, two seat back arrangements 108, and two headrests 110. The combination of these main components results in a lightweight and compact (from fore-to-aft) construction relative to conventional aircraft seat assemblies.

Lightweight composite support structure 102 has an upper end (hidden from view in FIG. 1) and a lower end that is suitably configured to accommodate attachment to the floor of the aircraft. The lower end may, for example, be designed for compatibility with seat mounting rails that are integrated into the floor of the aircraft. The upper end of support structure 102 is coupled to the lower side of seat base 104 using fasteners, an attachment mechanism, a suitable attachment material or composition, or the like. In practice, support structure 102 can be tuned according to the seating capacity of the particular aircraft seat assembly (two passengers for double seat assembly 100). In this regard, support structure 102 (and double seat assembly 100 in general) is suitably configured to provide structural support for two passengers and to satisfy any required structural, static, or dynamic tests, such as, for example, the "16G" dynamic testing mandated by the Federal Aviation Administration.

In the example embodiment, lightweight composite support structure 102 includes a plurality of composite legs 112. Each composite leg is a one-piece composite assembly in this example. Composite legs 112 may be identical and/or symmetrical to one another, and each composite leg 112 is individually coupled to the lower side of seat base 104 as mentioned above. In particular, each composite leg 112 has an upper end 114 (see FIG. 3) that is coupled to the lower side of seat base 104. An example construction for composite legs 112 is described in more detail below with respect to FIG. 4 and FIG. 5. Double seat assembly 100 may also include a luggage retaining bar 115 coupled to (or located near) support structure 102.

Lightweight composite seat base 104 has an upper side 116 (see FIG. 3), a lower side coupled to the upper end of lightweight composite support structure 102, a front (fore) section 118, and a rear (aft) section 120. Composite seat base 104 is a one-piece composite assembly in this example. An example construction for composite seat base 104 is described in more detail below with respect to FIG. 6 and FIG. 7.

Seat cushions 106 are positioned on upper side 116 of lightweight composite seat base 104. Double seat assembly 100 may utilize individual and physically distinct seat cushions 106 or a subassembly that includes seat cushions 106 coupled together. For example, seat cushions 106 may be joined together via a suitably configured webbing, seam, or connecting material. In accordance with one preferred embodiment, each seat cushion 106 includes a sealed pneumatic element that provides comfort to the passenger. An example construction for such a sealed pneumatic seat cushion is described in more detail below with respect to FIG. 8 and FIG. 9.

Seat back arrangements 108 are coupled to lightweight composite seat base 104 in a manner that enables them to recline and tilt forward as needed. In this example embodiment, each seat back arrangement 108 is a separate component, which enables independent pivoting relative to lightweight composite seat base 104. Each seat back arrangement 108 may include a seat back frame 122 and a seat back cushion 124 coupled to seat back frame 122. Seat back frame 122 provides structural support for seat back cushions 124. In addition, seat back frame 122 provides structural support for armrests 126. Seat back frame 122 may be coupled to rear section 120 of composite seat base 104 in an appropriate manner. For example, double seat assembly 100 may include an attachment architecture 128 coupled between composite seat base 104 and seat back frame 122.

In accordance with one preferred embodiment, each seat back cushion 124 includes a sealed pneumatic element that provides comfort to the passenger. An example construction for such a sealed pneumatic seat back cushion is described in more detail below with respect to FIG. 12 and FIG. 13.

Triple seat assembly 200 generally includes a lightweight composite support structure 202, a lightweight composite seat base 204 sized to accommodate three passengers, three seat cushions 206, three seat back arrangements 208, and three headrests 210. Triple seat assembly 200 shares a number of components and features with double seat assembly 100, and such common components and features will not be redundantly described in detail in the context of triple seat assembly 200. Triple seat assembly 200 is included here to illustrate another practical embodiment of the invention.

Figure 4:
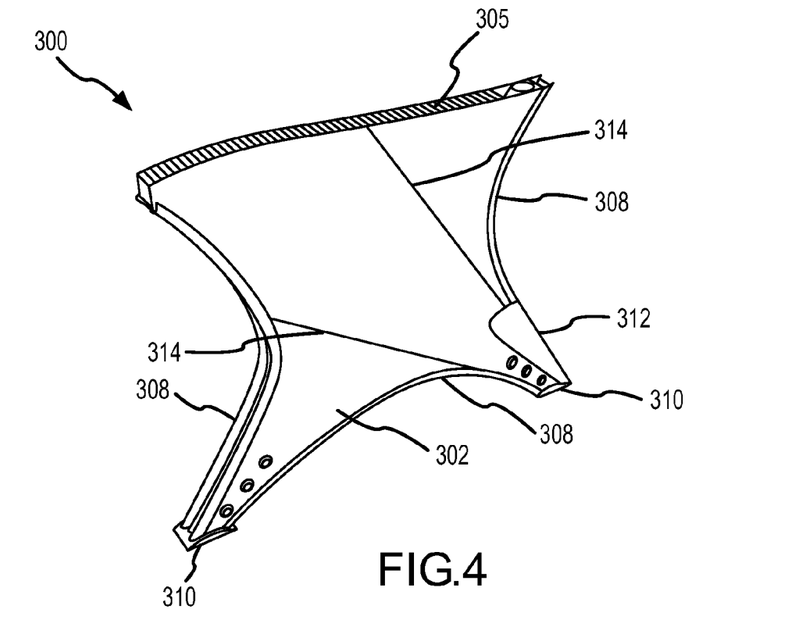
FIG. 4 is a side perspective view of a composite support structure suitable for use in an aircraft seat assembly configured in accordance with an example embodiment of the invention.
Figure 5:
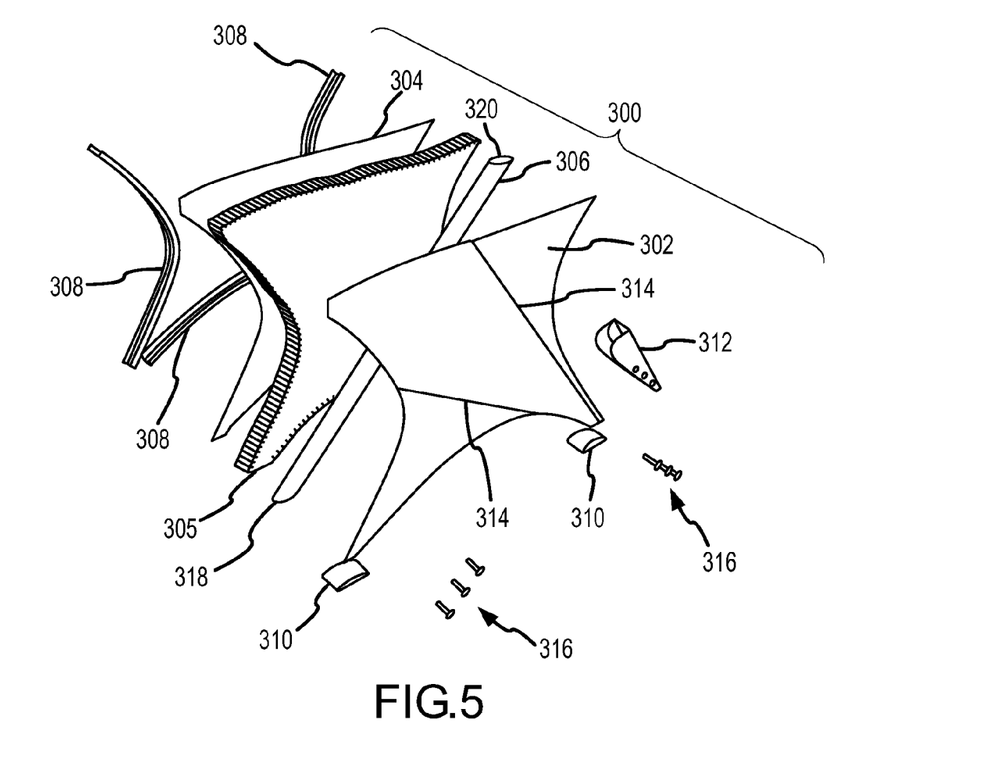
FIG. 5 is an exploded perspective view of the composite support structure shown in FIG. 4.

FIG. 4 is a side perspective view of a composite support leg 300 suitable for use in an aircraft seat assembly configured in accordance with an example embodiment of the invention, and FIG. 5 is an exploded perspective view of composite support leg 300. Composite support leg 300 is one example embodiment that may be utilized for each composite leg 112 in double seat assembly 100 and for each composite leg 212 in triple seat assembly 200. It should be appreciated that a practical aircraft seat assembly according to the invention may employ composite support legs having different constructions and configurations than that depicted in FIG. 4 and FIG. 5.

Composite support leg 300 generally includes a first side panel 302, a second side panel 304, a core material 305 between first side panel 302 and second side panel 304, and at least one rigid reinforcement member 306 between first side panel 302 and second side panel 304. Composite support leg 300 may also include edge banding 308, floor mounting hardware 310, and a scuff plate 312.

First side panel 302 and second side panel 304 may each be formed from a suitable material, such as a metal sheet or a composite construction, which may (but need not) be reinforced. In one example embodiment, each side panel is a composite construction formed from a fiber reinforced plastic. The reinforcing fiber may be carbon fiber, fiberglass, or any suitable fibrous material. In practice, each side panel may have a thickness within the range of 0.005 inch to 0.100, and the thickness need not be uniform. In other words, the thickness of a side panel may be tailored to suit the structural needs of support leg 300. The perimeter shape and size of first side panel 302 and second side panel 304 generally correspond to the overall perimeter shape and size of composite support leg 300.

In this example, first side panel 302 and second side panel 304 include one or more tendons 314, "C" channels, or any suitable reinforcement element formed therein or coupled thereto. These tendons 314 can be realized as additional material that is laminated into the side panels at the time of fabrication, and these tendons 314 are sized, shaped, and located to provide additional structural support and rigidity. The tendons 314 are preferably located according to the anticipated concentrated load paths.

Core material 305 is a lightweight filler material or composition that provides additional structural integrity to composite support leg 300. In this example, core material 305 is formed from a suitable honeycomb material, such as HEX-WEB honeycomb material (available from Hexcel Corporation), NOMEX material (available from DuPont), or the like. Alternatively, core material 305 may include or be formed from a metal honeycomb, plastic foam, graphite foam, or the like. In the example embodiment, core material 305 has a thickness within the approximate range of 0.25 inch to 1.5 inches (this thickness need not be uniform throughout support leg 300). The honeycomb core material 305 may have a plurality of cells that are generally orthogonal relative to first side panel 302 and second side panel 304. The honeycomb core material 305 is preferably sandwiched between, and coupled to, first side panel 302 and second side panel 304. In practice, the honeycomb core material 305 may be attached to first side panel 302 and second side panel 304 using a suitable glue, adhesive, epoxy, or the like. Additionally or alternatively, this sandwich construction may be coupled together using fasteners or any suitable attachment mechanism or architecture. In this example, fasteners 316 are used to mechanically fasten the composite sandwich portion of support leg 300 to metal seat track components that are captured in the support leg construction. These seat track components may be utilized to attach the seat assembly to the floor tracks.

Composite support leg 300 may, but need not, include one or more rigid reinforcement members 306 between first side panel 302 and second side panel 304. In this example composite support leg 300 includes one rigid reinforcement member 306 sandwiched between first side panel 302 and second side panel 304. Rigid reinforcement member 306 may be sized, shaped, and positioned according to the desired structural, static, and dynamic characteristics of composite support leg 300. FIG. 5 depicts one suitable configuration where rigid reinforcement member 306 is a cylindrical tube that runs diagonally across composite support leg 300 in a plane that is generally parallel to the plane defined by core material 305. In this embodiment, rigid reinforcement member 306 has a lower end 318 located at the lower fore section of composite support leg 300, and an upper end 320 located at the upper aft section of composite support leg 300. Core material 305 may include a suitable configured cutout or slot that accommodates rigid reinforcement member 306, or core material 305 may be divided into two or more sections that are positioned around rigid reinforcement member 306. In this regard, rigid reinforcement member 306 may be attached to first side panel 302, second side panel 304, and/or core material 305 using a suitable glue, adhesive, epoxy, or the like. Additionally or alternatively, this sandwich construction may be coupled together using fasteners 316 or any suitable attachment mechanism or architecture.

Rigid reinforcement member 306 may be a cylindrical tube (as shown), a non-cylindrical tube, or a solid structure having any suitable shape. Rigid reinforcement member 306 is preferably formed from a lightweight material having the desired structural, static, and dynamic properties. In one embodiment, rigid reinforcement member 306 is formed from a carbon fiber material, which may (but need not) be reinforced.

Edge banding 308 may be utilized to provide a finished appearance to composite support leg 300. Edge banding 308 may be formed from metal, plastic, or the like. In this example, scuff plate 312 is coupled to the lower aft section of composite support leg 300. Scuff plate 312 protects composite support leg 300 from scrapes and shoe scuffs when the seat assembly is deployed in a passenger aircraft. Floor mounting hardware 310 may be coupled to the lower fore and lower aft sections of composite support leg 300 to provide mounting features for the seat assembly. For example, floor mounting hardware 310 may be configured for compatibility with seat tracks or rails located on the cabin floor of the aircraft.

Composite support leg 300 may include one or more local inserts (not shown) that are configured to provide additional support for point loads such as composite seat base 400, the floor mounting features, seat belt connection points, footrest connection points, or the like. A local insert may be realized as a metal plate, a wooden block, a hard plastic component, a portion of the core material that has been replaced with a filler such as glue or epoxy, or the like. Point loads can be coupled to the local inserts rather than directly to the core material and/or the panels that surround the core material.

Figure 6:
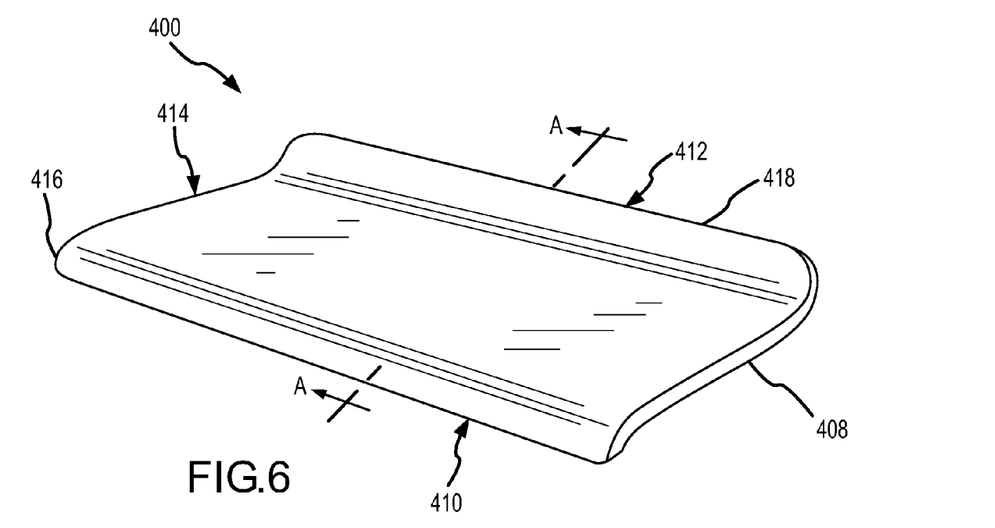
FIG. 6 is a front perspective view of a composite seat base suitable for use in an aircraft seat assembly configured in accordance with an example embodiment of the invention.
Figure 7:
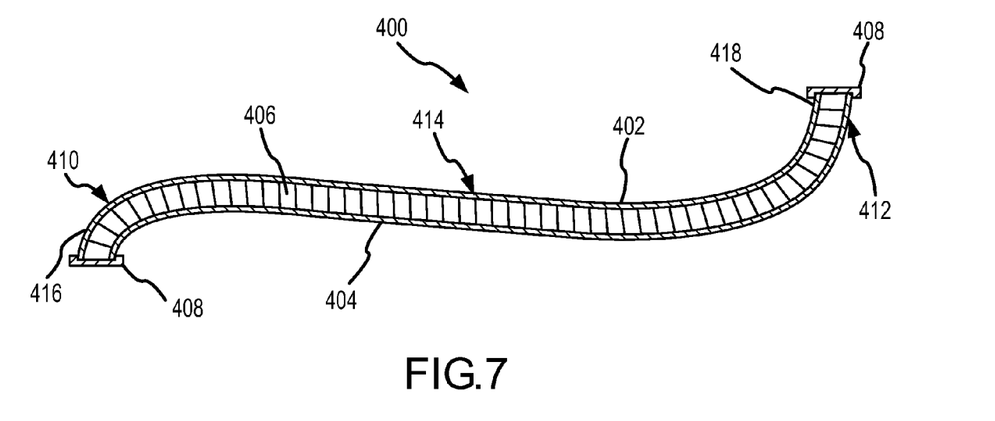
FIG. 7 is a cross sectional view of the composite seat base as viewed from line A-A in FIG. 6.

FIG. 6 is a front perspective view of a composite seat base 400 suitable for use in an aircraft seat assembly configured in accordance with an example embodiment of the invention, and FIG. 7 is a cross sectional view of composite seat base 400 as viewed from line A-A in FIG. 6. Composite seat base 400 is one example embodiment that may be utilized for seat base 104 in double seat assembly 100 and for seat base 204 in triple seat assembly 200. It should be appreciated that a practical aircraft seat assembly according to the invention may employ a composite seat base a different construction and/or configuration than that depicted in FIG. 6 and FIG. 7.

Composite seat base 400 generally includes an upper panel 402, a lower panel 404, and a core material 406 between upper panel 402 and lower panel 404. Composite seat base 400 may also include edge banding 408 around its exposed perimeter edges. In this example, composite seat base 400 includes a front (fore) section 410, a rear (aft) section 412, and a main support section 414 between front section 410 and rear section 412. Front section 410 may have a gradual downward curvature that forms a lip 416 at the front edge of composite seat base 400. Rear section 412 may have an upward curvature that terminates at an upper edge 418 of composite seat base 400. As described in more detail below, upper edge 418 is suitably configured to function as a support feature for the seat back assembly. Composite seat base 400 is preferably realized as a one-piece lightweight component, which promotes simple and cost-effective manufacturing relative to conventional designs that require assembly of metal tubes, metal membranes, and heavy structural components. In this regard, composite seat base 400 need not incorporate any rigid reinforcement members other than the panels and the core material.

Upper panel 402 and lower panel 404 may each be formed from a suitable material, such as a carbon fiber sheet, which may (but need not) be reinforced. Each of these panels may have the general characteristics and composition of first side panel 302 and second side panel 304, as described above. The perimeter shape and size of upper panel 402 and lower panel 404 generally correspond to the overall perimeter shape and size of composite seat base 400.

Core material 406 is a lightweight filler material or composition that provides additional structural integrity to composite seat base 400. Core material 406 may have the general characteristics and composition of core material 305 utilized by support leg 300 (see above description of core material 305). In this example, core material 406 is formed from a suitable honeycomb material having a thickness within the range of about 0.25 inch to 1.5 inches (this thickness need not be uniform throughout seat base 400). The honeycomb core material 406 may have a plurality of cells that are generally orthogonal relative to upper panel 402 and lower panel 404 (see FIG. 7). The honeycomb core material 406 is preferably sandwiched between, and coupled to, upper panel 402 and lower panel 404. In practice, the honeycomb core material 406 may be attached to upper panel 402 and lower panel 404 using a suitable glue, adhesive, epoxy, or the like. Additionally or alternatively, this sandwich construction may be coupled together using fasteners or any suitable attachment mechanism or architecture. In a practical embodiment, composite seat base 400 can be designed such that core material 406 crushes or flexes in response to heavy loading or dynamic stresses, while upper panel 402 and lower panel 404 retain their shape and support function. Such responsiveness may be desirable to provide enhanced ergonomic benefit.

Composite seat base 400 may include one or more local inserts (not shown) that are configured to provide additional support for point loads such as seat belt connection points, footrest connection points, armrest connection points, or the like. A local insert may be realized as a metal plate, a wooden block, a hard plastic component, a portion of the core material that has been replaced with a filler such as glue or epoxy, or the like. Point loads can be coupled to the local inserts rather than directly to the core material and/or the panels that surround the core material.

Figure 8:
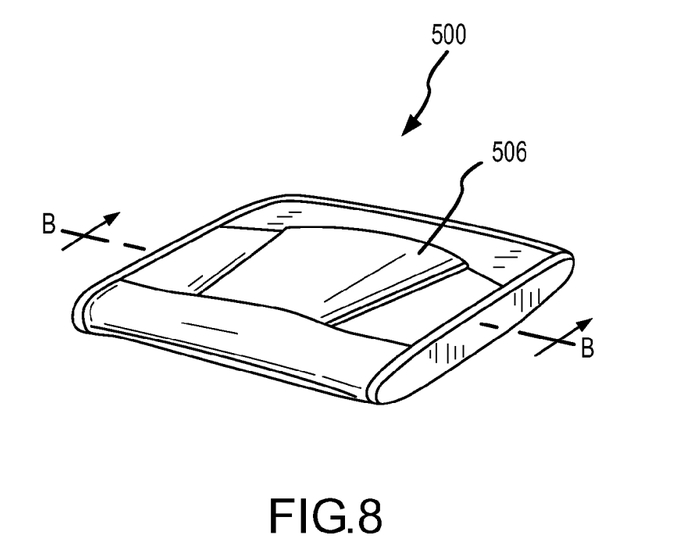
FIG. 8 is a front perspective view of a seat cushion suitable for use in an aircraft seat assembly configured in accordance with an example embodiment of the invention.
Figure 9:
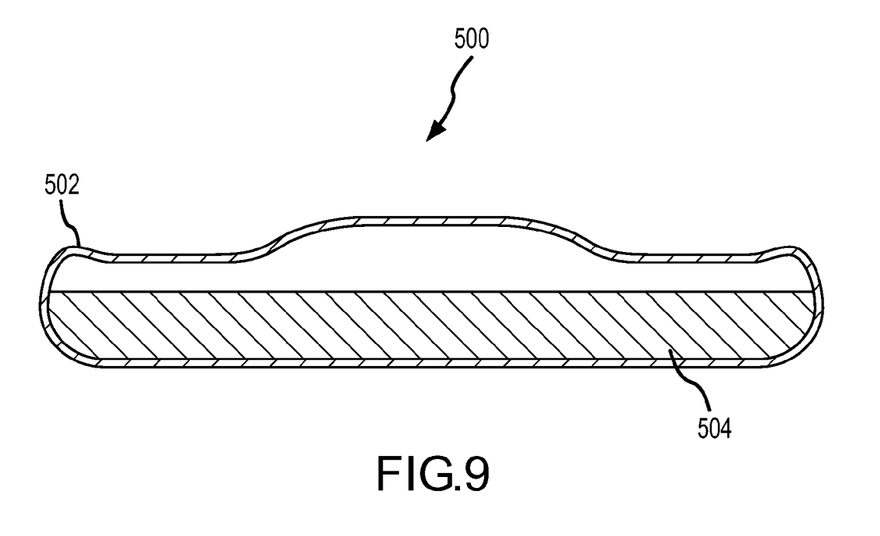
FIG. 9 is a cross sectional view of the seat cushion as viewed from line B-B in FIG. 8.

FIG. 8 is a front perspective view of a seat cushion 500 suitable for use in an aircraft seat assembly configured in accordance with an example embodiment of the invention, and FIG. 9 is a cross sectional view of seat cushion 500 as viewed from line B-B in FIG. 8. As mentioned briefly above, seat cushion 500 may be realized as a sealed pneumatic element having a sealed outer bag 502, a cushioning material 504 enclosed within sealed outer bag 502, and a gas enclosed within sealed outer bag 502. Although not shown in FIG. 9, seat cushion 500 may also include an upholstered cover or casing 506 surrounding sealed outer bag 502. Seat cushion 500 is designed such that it self-inflates when the aircraft cabin is pressurized, thus providing additional air cushioning for the passenger during flight. When the aircraft is grounded, however, seat cushion 500 deflates such that cushioning material 504 provides most, if not all, of the cushioning for the passenger.

Sealed outer bag 502 is formed from any material that can accommodate repeated inflations and deflations, and that can withstand passenger loading. In the example embodiment, sealed outer bag 502 is formed from a resilient and flexible thermoplastic elastomer, such as a polyurethane material. In a multiple-passenger configuration, sealed outer bag 502 may include distinct and separate compartments for each passenger, effectively providing separate cushions for each passenger. The gas within sealed outer bag 502 may be air, nitrogen, or the like. In operation, the gas and sealed outer bag 502 react to external air pressure conditions to provide increased cushioning for aircraft cabin pressurization conditions.

Cushioning material 504 bears the passenger load when the aircraft cabin is not pressurized. Cushioning material 504 may be, for example, a foam material having a desired density. As shown in FIG. 9, cushioning material 504 may be centrally located within its respective compartment; cushioning material 504 may be affixed to the upper or lower interior surface of sealed outer bag 502 to enable inflation and deflation of seat cushion 500 around cushioning material 504. The self-inflating characteristic of seat cushion 500 extends the life of cushioning material 504 and enables the use of lower density, co-molded densities and or lower thickness foams, that will provide even better comfort then current cushions for taxi, take-off, and landing scenarios, with the sealed outer bag 502 bearing the passenger load and providing enhanced comfort during flight over current cushion technologies.

Figure 10:
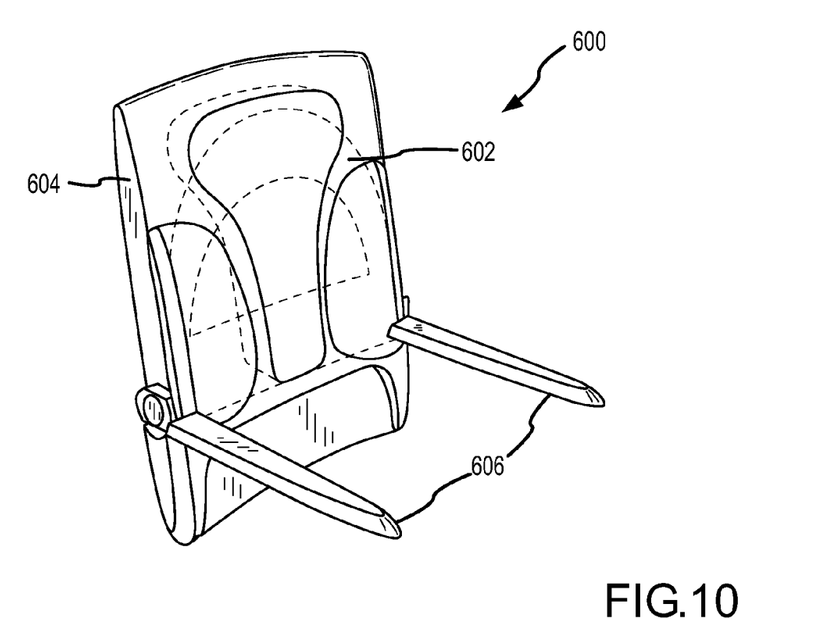
FIG. 10 is a front perspective phantom view of a seat back arrangement suitable for use in an aircraft seat assembly configured in accordance with an example embodiment of the invention.

FIG. 10 is a front perspective phantom view of a seat back arrangement 600 suitable for use in an aircraft seat assembly configured in accordance with an example embodiment of the invention. A double seat assembly will include two seat back arrangements 600 (see FIG. 1). Seat back arrangement 600 generally includes a seat back frame 602 (depicted in dashed lines), a seat back cushion 604 supported by seat back frame 602, and at least one armrest 606 coupled to seat back frame 602. As described above in connection with FIG. 1 and FIG. 3, seat back frame 602 is configured for attachment to the rear section of the composite seat base, and seat back cushion 604 is coupled to seat back frame 602. In this example embodiment, seat back frame 602 functions as an internal support structure for seat back cushion 604. During assembly, seat back cushion 604 is installed over seat back frame 602 and secured to seat back frame 602 using fasteners, adhesive, or any suitable attachment mechanism or material. Depending upon the configuration of the seat assembly, a single armrest 606 may be shared by two passengers.

Figure 11:
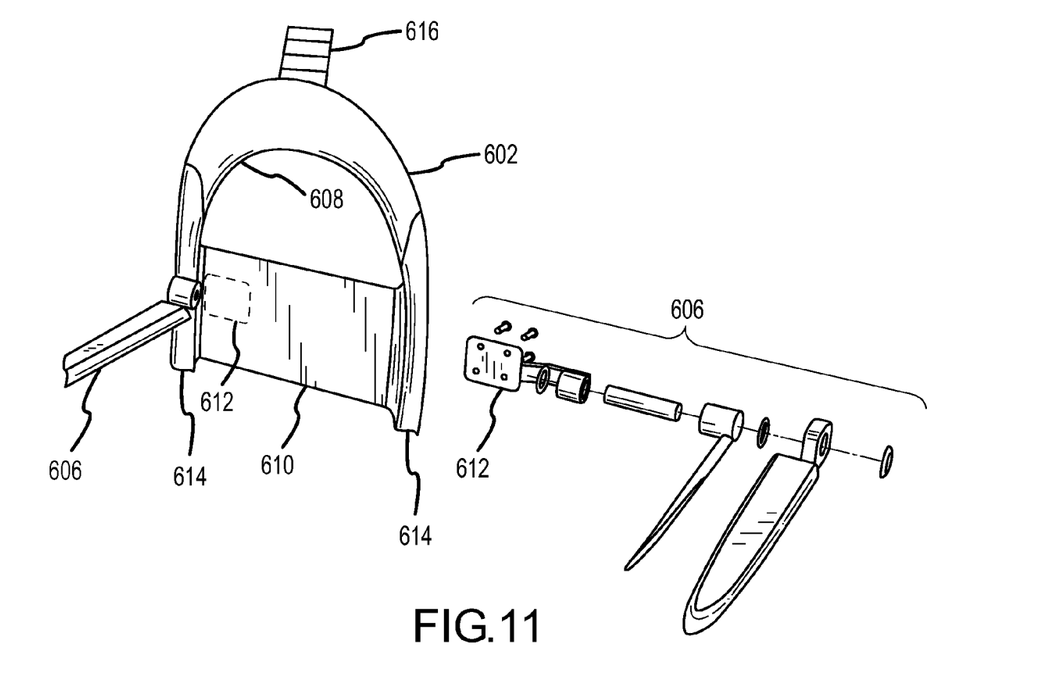
FIG. 11 is a front perspective view of a seat back frame, along with an exploded perspective view of an armrest, suitable for use in the seat back arrangement shown in FIG. 10.

FIG. 11 is a front perspective view of seat back frame 602, including an exploded perspective view of one armrest 606. Seat back frame 602 is preferably formed from a strong and lightweight material, for example, carbon fiber, an injection molded thermoplastic, or the like. In this embodiment, seat back frame 602 has an arched section 608 and a transverse section 610 that is coupled to or integrated with arched section 608. Arched section 608 provides support for the upper back area of the passenger, and transverse section 610 provides support for the lower back area of the passenger. In example installations, seat back frame 602 is positioned toward the rear of seat back cushion 604 for added passenger comfort.

Transverse section 610 may be configured to accommodate attachment of armrests 606. In this regard, armrests 606 may include a mounting plate 612 configured for coupling to transverse section 610 as shown in FIG. 11. Armrests 606 may be suitably configured to swing up and down at a pivot point maintained by mounting plate 612. FIG. 11 depicts one armrest 606 in exploded form to illustrate how it can be configured to pivot in this manner. Mounting of armrests 606 on seat back frame 602 rather than the seat back pivot structure is desirable for ergonomic benefit.

Seat back frame 602 may also include suitably configured mounting features that facilitate mounting of seat back frame 602 to the composite seat base. In this embodiment, the legs 614 of arched section 608 serve as mounting locations for seat back frame 602, as described in more detail below. Seat back frame 602 may also include suitably configured mounting features that facilitate mounting of a headrest to the seat assembly (see FIGS. 1-3). For example, seat back frame 602 may include a mounting plate 616 that protrudes from the top of arched section 602. The mounting plate 616 extends through the top of the seat back cushion, which includes a slot formed in its upper edge. The mounting plate 616 is configured to receive a headrest, which may be affixed to mounting plate 616 in any suitable manner, e.g., fasteners, adhesive, press-fit, snaps, or the like. The use of lightweight slip-on headrests can further reduce the overall weight of the seat assembly.

Figure 12:
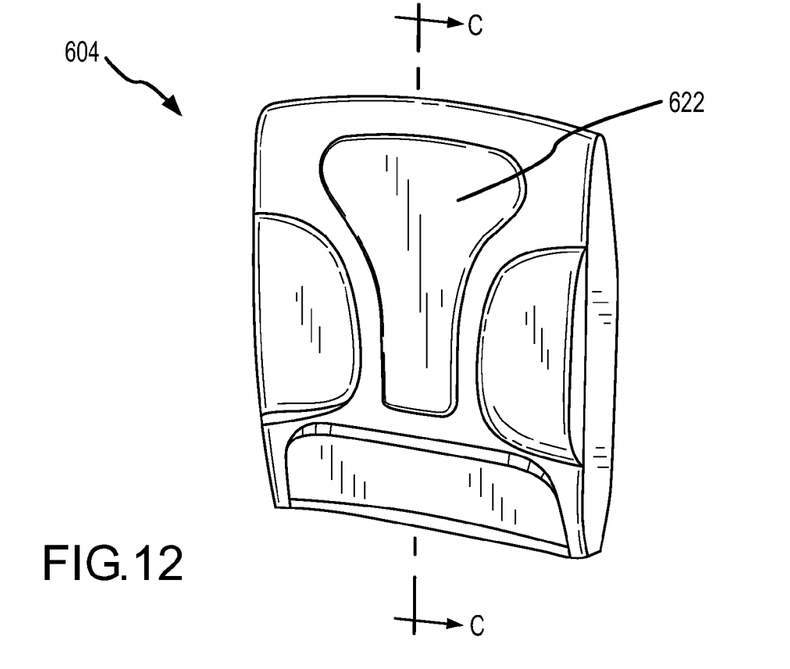
FIG. 12 is a front perspective view of a seat back cushion suitable for use in an aircraft seat assembly configured in accordance with an example embodiment of the invention.
Figure 13:
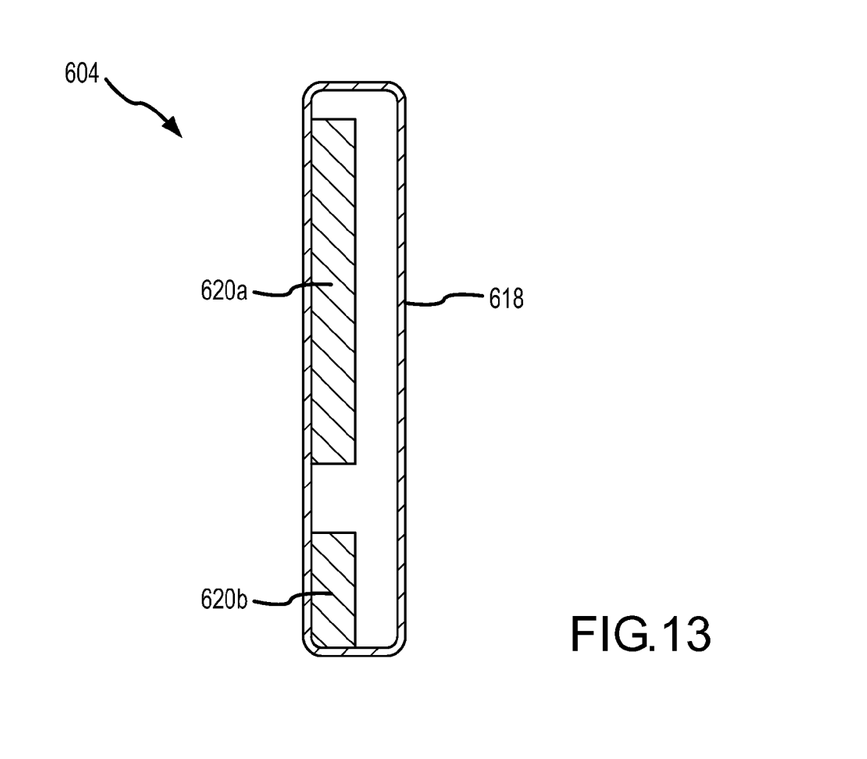
FIG. 13 is a cross sectional view of the seat back cushion as viewed from line C-C in FIG. 12.

Seat back cushion 604 may employ traditional cushioning, or self-inflating cushioning. FIG. 12 is a front perspective view of seat back cushion 604, and FIG. 13 is a cross sectional view of seat back cushion 604 as viewed from line C-C in FIG. 12. Seat back cushion 604 may be generally configured as described above for seat cushion 500. In this regard, seat back cushion 604 may be realized as a sealed pneumatic element having a sealed outer bag 618, a cushioning material 620 enclosed within sealed outer bag 618, and a gas enclosed within sealed outer bag 618. Although not shown in FIG. 13, seat back cushion 604 may also include an upholstered cover or casing 622 surrounding sealed outer bag 602. In this embodiment, cushioning material 620 includes an upper cushioning material 620a and a lower cushioning material 620b.

Seat back cushion 604 is designed such that it self-inflates when the aircraft cabin is pressurized, thus providing additional air cushioning for the passenger during flight. Thus, the gas and sealed outer bag 618 react to external air pressure conditions to provide increased cushioning for aircraft cabin pressurization conditions. When the aircraft is grounded, however, seat back cushion 604 deflates such that cushioning material 620 provides most, if not all, of the cushioning for the passenger. Seat back cushion 604 and seat cushion 500 share a number of features and characteristics, and such common aspects will not be redundantly described in the context of seat back cushion 604.

Figure 14:
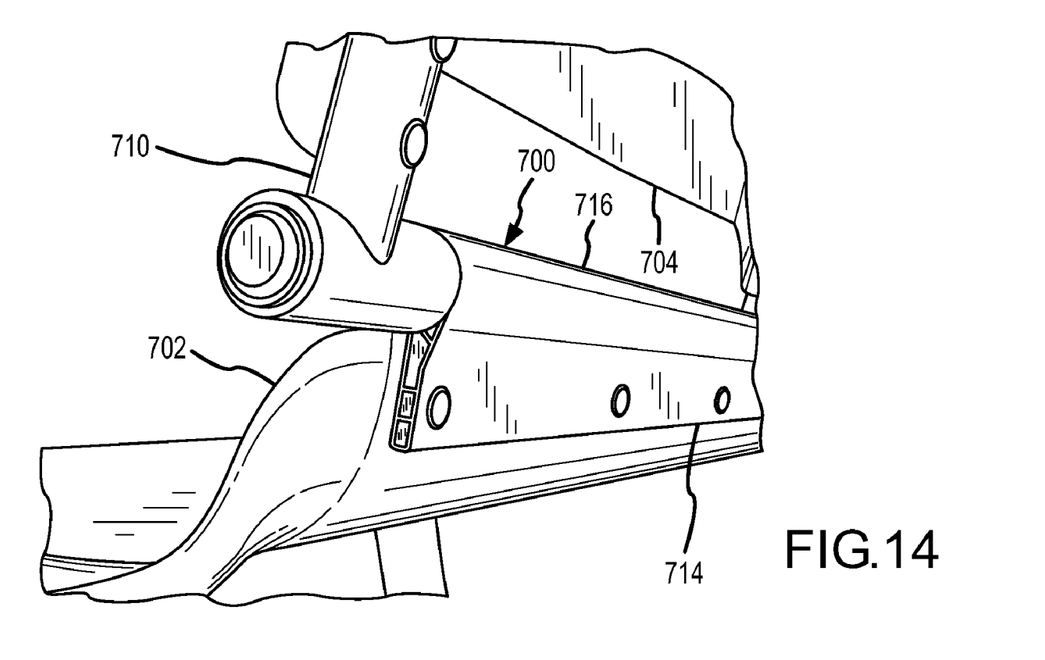
FIG. 14 is a perspective detail view of an attachment architecture suitable for use in an aircraft seat assembly configured in accordance with an example embodiment of the invention.
Figure 15:
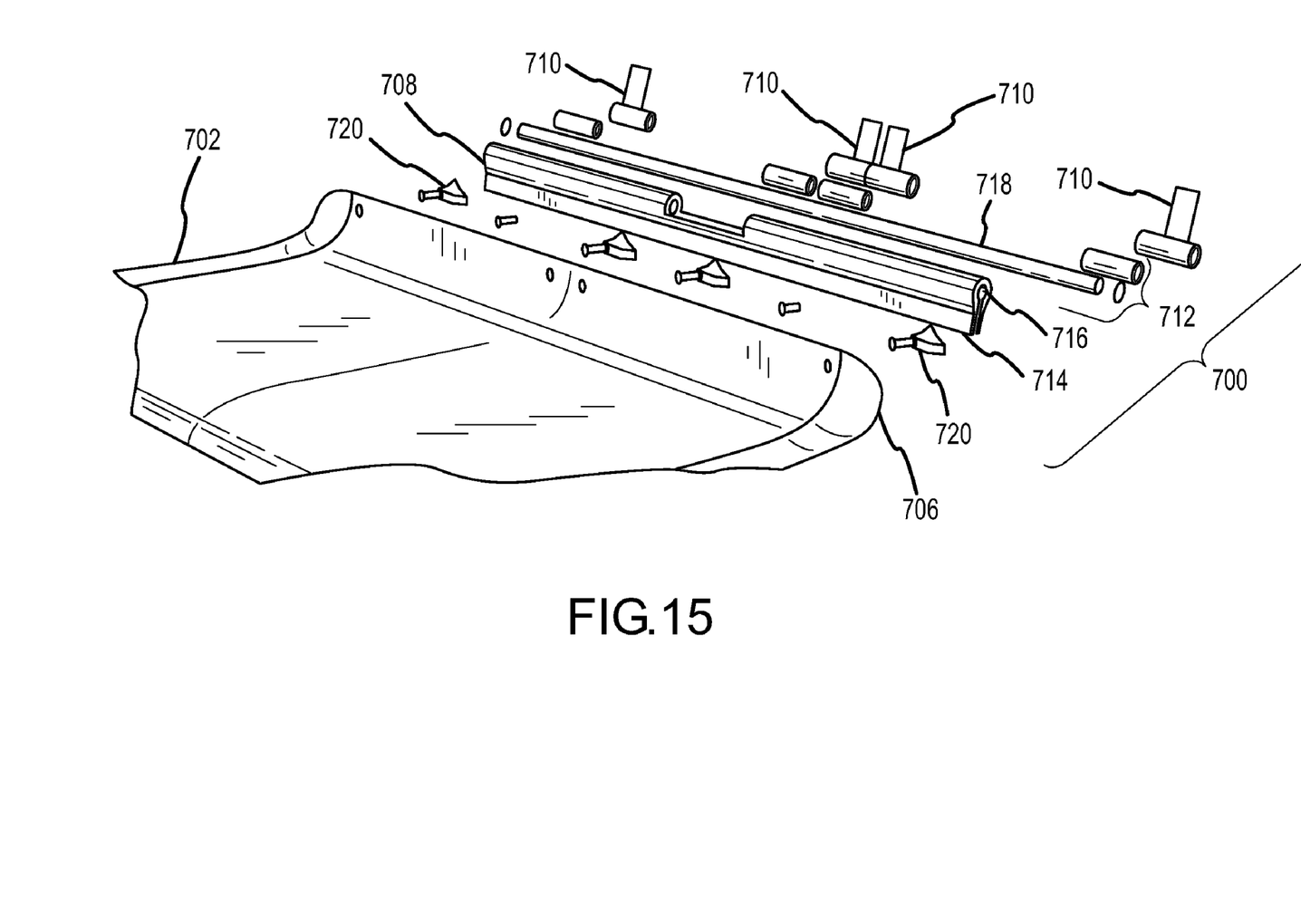
FIG. 15 is an exploded perspective view of the attachment architecture shown in FIG. 14, along with other components of the aircraft seat assembly.

FIG. 14 is a perspective detail view of an attachment architecture 700 suitable for use in an aircraft seat assembly configured in accordance with an example embodiment of the invention, and FIG. 15 is an exploded perspective view of attachment architecture 700 along with other components of the aircraft seat assembly (FIG. 15 represents a double seat configuration). In this example, attachment architecture 700 couples a lightweight composite seat base 702 to a seat back assembly 704. Attachment architecture 700 is suitably configured to enable seat back assembly 704 (and, therefore, the seat back frame in seat back assembly 704) to pivot relative to the rear section 706 of seat base 702. For simplicity, FIG. 14 and FIG. 15 do not show a seat cushion that would otherwise be carried by seat base 702.

Attachment architecture 700 may generally include a support structure 708, pivoting frame mounts 710, and hinge hardware 712. Support structure 708 is formed from a strong and rigid material, such as extruded aluminum, reinforced carbon fiber, or the like. Support structure 708 resembles a clip having a lower portion 714 that is installed over and secured to the edge of rear section 706. Lower portion 714 can be attached to rear section 706 of seat base 702 using fasteners (as shown in FIG. 14), a bonding material, or the like. Support structure 708 includes an upper tube portion 716 configured to receive a piece of hinge hardware 712, e.g., a rod 718.

Pivoting frame mounts 710 are installed onto rod 718 and positioned to receive their respective seat back frames. The upwardly extending portions of pivoting frame mounts 710 may be coupled to the legs of the seat back frame (using fasteners, clips, or any suitable coupling mechanism) as mentioned above in connection with FIG. 11. The example embodiment shown in FIG. 15 utilizes two pivoting frame mounts 710 per seat back assembly. Pivoting frame mounts 710 and hinge hardware 712 are configured and arranged such that each seat back assembly can independently pivot relative to seat base 702.

Attachment architecture 700 may also include additional mounting or coupling features, elements, or components. For example, attachment architecture 700 may include seat belt anchoring features, such as anchoring hardware 720. The seat belt anchoring hardware 720 may be coupled to or incorporated into support structure 708, which can be designed in accordance with any applicable safety standards. Although not depicted in FIG. 14 or FIG. 15, attachment architecture 700 may include armrest anchoring features. Such an embodiment may be utilized in lieu of the arrangement shown in FIG. 10 and FIG. 11, where armrests 606 are coupled to seat back frame 602.

Figures 16, 17:
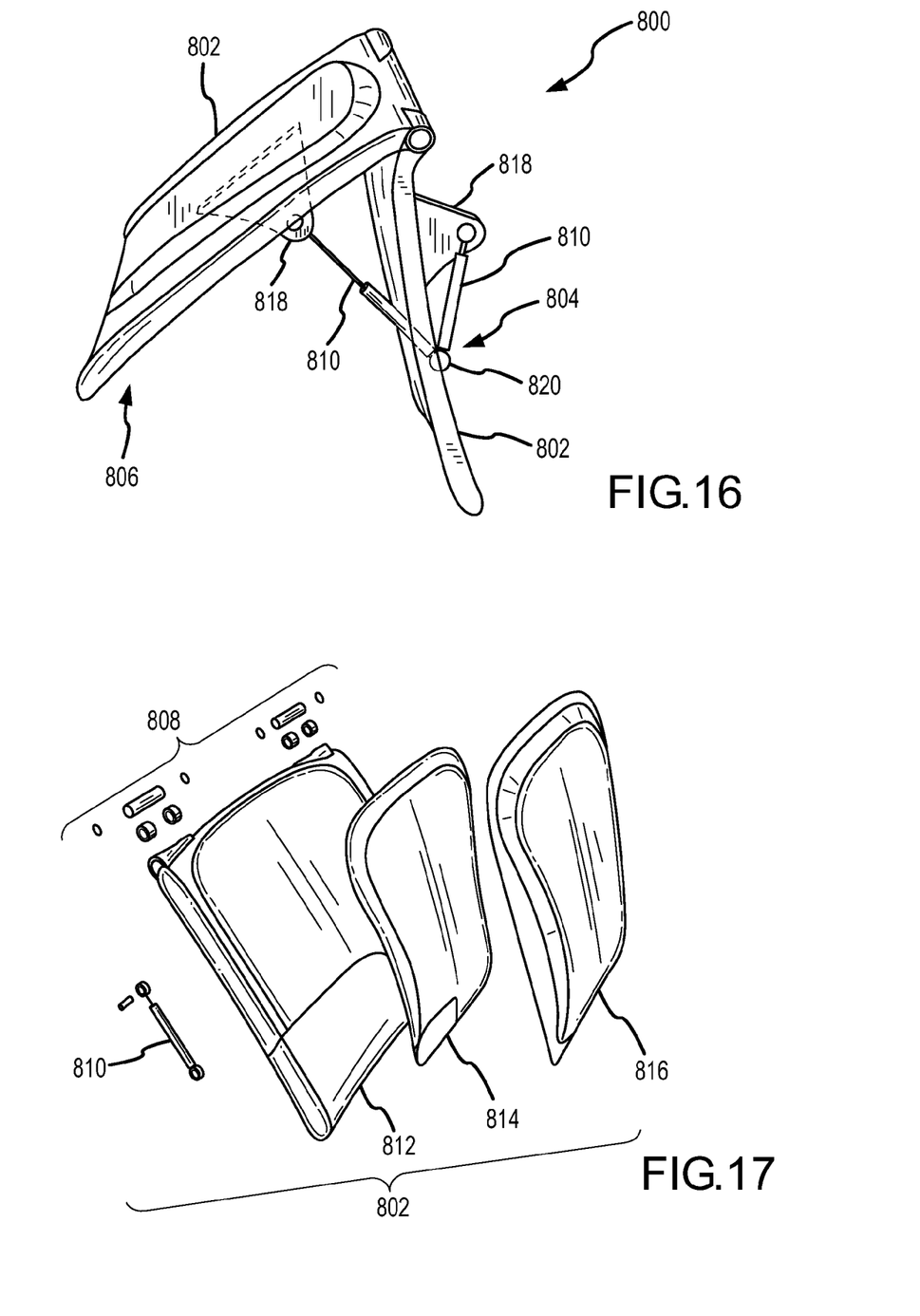
FIG. 16 is a side perspective view of a footrest arrangement suitable for use in an aircraft seat assembly configured in accordance with an example embodiment of the invention.
FIG. 17 is an exploded perspective view of a footrest suitable for use in an aircraft seat assembly configured in accordance with an example embodiment of the invention.

FIG. 16 is a side perspective view of a footrest arrangement 800 suitable for use in an aircraft seat assembly configured in accordance with an example embodiment of the invention, and FIG. 17 is an exploded perspective view of a footrest 802 suitable for use with footrest arrangement 800. FIG. 16 depicts footrest arrangement 800 in a retracted position 804 and an extended position 806 (superimposed over each other). Footrest arrangement 800 generally includes footrest 802, a hinge assembly 808, and a spring element 810.

Footrest 802 is preferably configured as a lightweight and sturdy construction. As shown in FIG. 17, footrest 802 may include a substrate 812, a cushion 814, and a finishing material 816. Substrate 812 is formed from any suitable material, such as a thermoplastic material, reinforced carbon fiber, a molded plastic, or the like. Cushion 814 may be a foam material, a polyurethane material, or any suitably resilient material. Finishing material 816 may be a fabric, canvas, or any upholstery element that covers cushion 814. Footrest 802 may be manufactured as an assembly part, or it may be formed in a single process (such as a back molded thermoplastic process) that eliminates the need for gluing and assembly. The relatively lightweight construction of footrest arrangement 800 makes it a practical option for aircraft passenger seats.

Footrest 802 can be pivotally attached to the lower side of the seat base using hinge assembly 808. Spring element 810, which may be a pneumatic gas-charged spring, is coupled between a hinge support 818 located under substrate 812 and a fixed mounting point 820 on the seat assembly. Fixed mounting point 820 may be, for example, a point on the seat support structure, a point on a seat support leg, or a point on an element that is coupled to the seat support structure. Spring element 810 is biased to enable a user to swing footrest 802 outward to maintain its extended position 806. Spring element 810 is also biased to enable a user to push footrest 802 inward to maintain its retracted position 804. When in its retracted position, footrest 802 may rest against the carry-on retaining frame below the seat assembly.

An aircraft seat assembly as described herein utilizes a number of lightweight components to achieve a significant reduction in weight relative to existing aircraft seat designs. As an example, an aircraft with 200 seats could realize a weight savings of about 1,000 to 3,000 pounds, which represents a 30% to 50% reduction in seat weight. Moreover, the use of composite materials and the pneumatic cushion design described herein results in a slim fore-aft dimension, which translates to additional legroom at current pitch scenarios, or the potential for increased passenger counts at reduced pitch with equivalent roominess.

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention, where the scope of the invention is defined by the claims, which includes known equivalents and foreseeable equivalents at the time of filing this patent application.

What is claimed is:

1. An aircraft seat assembly comprising:
   a lightweight composite support structure having an upper end, said lightweight composite support structure, comprises a first side panel; a second side panel; a core material between the first side panel and the second side panel; and at least one rigid reinforcement member between the first side panel and the second side panel; each of said first and second side panels coupled to floor mounting hardware at a location approximately below a front most portion of said seat base and at a location approximately below a back most portion of said seat base,
   said lightweight composite seat base having an upper side, a lower side, and a rear section, the lower side being coupled to the upper ends of the one piece support legs, said composite seat base a one piece composite structure;
   a seat cushion positioned on the upper side of the lightweight composite seat base;
   a seat back frame coupled to the rear section of the lightweight composite seat base; and
   a seat back cushion coupled to the seat back frame.

2. An aircraft seat assembly according to claim 1, further comprising an attachment architecture coupled between the lightweight composite seat base and the seat back frame.

3. An aircraft seat assembly according to claim 2, the attachment architecture being configured to enable the seat back frame to pivot relative to the rear section of the lightweight composite seat base.

4. An aircraft seat assembly according to claim 2, the attachment architecture comprising seat belt anchoring features.

5. An aircraft seat assembly according to claim 2, the attachment architecture comprising armrest anchoring features.

6. An aircraft seat assembly according to claim 1, wherein:
   the first side panel comprises a first carbon fiber containing sheet;
   the second side panel comprises a second carbon fiber containing sheet;
   the core material comprises a honeycomb material; and
   the at least one rigid reinforcement member comprises a lightweight tube.

7. An aircraft seat assembly according to claim 1, the lightweight composite support structure being configured according to a seating capacity of the aircraft seat assembly to, satisfy structural, static, or dynamic tests required by the Federal Aviation Administration including 16G dynamic testing.

8. An aircraft seat assembly according to claim 1, the lightweight composite seat base comprising:
   an upper panel;
   a lower panel; and
   a core material between the upper panel and the lower panel.

9. An aircraft seat assembly according to claim 8, wherein:
   the upper panel comprises a first carbon fiber containing sheet;
   the lower panel comprises a second carbon fiber containing sheet; and
   the core material comprises a honeycomb material.

10. An aircraft seat assembly according to claim 1, the seat cushion comprising a sealed pneumatic element.

11. An aircraft seat assembly according to claim 10, the sealed pneumatic element comprising:
    a sealed outer bag;
    a cushioning material enclosed, within the sealed outer bag; and
    a gas enclosed within the sealed outer bag;
    wherein the gas and the sealed outer bag react to air pressure conditions external to said sealed outer bag to provide increased air cushioning for aircraft cabin pressurization conditions.

12. An aircraft seat assembly according to claim 1, the seat back cushion comprising a sealed pneumatic element.

13. An aircraft seat assembly according to claim 12, the sealed pneumatic element comprising:
    a sealed outer bag;
    a cushioning material enclosed within the sealed outer bag; and
    a gas enclosed within the sealed outer bag;
    wherein the gas and the sealed outer bag react to air pressure conditions external to said sealed outer bag to provide increased air cushioning for aircraft cabin pressurization conditions.

14. An aircraft seat assembly comprising:
    a plurality of lightweight composite support legs, each support leg a one piece composite structure, comprises a first side panel; a second side panel; a core material between the first side panel and the second side panel; and at least one rigid reinforcement member between the first side panel and the second side panel; each of said first and second side panels coupled to floor mounting hardware at a location approximately below a front most portion of said seat base and at a location approximately below a back most portion of said seat base,
    said one-piece lightweight composite seat base having an upper side and a lower side, the lower side being coupled to each of the lightweight composite support legs; and
    a sealed pneumatic seat cushion positioned on the upper side of the lightweight composite seat base;
    wherein said one piece composite support legs comprise first and second side panels comprising fiber reinforced plastic.

15. An aircraft seat assembly according to claim 14, each of the lightweight composite support legs comprising:
    said first side panel comprising carbon fiber;
    said second panel comprising carbon fiber;
    a honeycomb core material sandwiched between and coupled to the first carbon fiber containing side panel and the second carbon fiber containing side panel; and at least one carbon fiber containing reinforcement member sandwiched between the first carbon fiber containing side panel and the second carbon fiber containing side panel.

16. An aircraft seat assembly according to claim 14, the one-piece lightweight composite seat base comprising:
    a carbon fiber containing upper panel;
    a carbon fiber containing lower panel; and
    a honeycomb core material sandwiched between and coupled to the carbon fiber containing upper panel and the carbon fiber containing lower panel.

17. An aircraft seat assembly according to claim 14, the sealed pneumatic seat cushion comprising:
    a sealed polyurethane outer bag;
    a foam material enclosed within the sealed polyurethane outer bag; and
    a gas enclosed within the sealed polyurethane outer bag;
    wherein the gas and the sealed polyurethane outer bag react to external air pressure conditions to provide increased air cushioning for aircraft cabin pressurization conditions.

18. An aircraft seat assembly according to claim 14, further comprising:
    an attachment architecture coupled to the one-piece lightweight composite seat base;
    a seat back frame coupled to the attachment architecture; and
    a seat back cushion coupled to the seat back frame;
    wherein the attachment architecture is configured to enable the seat back frame to pivot relative to the one-piece lightweight composite seat base.

* * * * *